US007338726B2

(12) United States Patent
Blanckaert et al.

(10) Patent No.: US 7,338,726 B2
(45) Date of Patent: Mar. 4, 2008

(54) MULTI-LAYERED CELL, PARTICULARLY A LIQUID CRYSTAL DISPLAY CELL, OR ELECTROCHEMICAL PHOTOVOLTAIC CELL

(75) Inventors: Nicolas Blanckaert, Neuchâtel (CH); Rolf Klappert, Neuchâtel (CH)

(73) Assignee: Asulab S.A., Marin (CH)

( * ) Notice: Subject to any disclaimer, the term of this patent is extended or adjusted under 35 U.S.C. 154(b) by 680 days.

(21) Appl. No.: 10/463,459

(22) Filed: Jun. 18, 2003

(65) Prior Publication Data
US 2003/0235722 A1    Dec. 25, 2003

(30) Foreign Application Priority Data
Jun. 21, 2002   (CH) .................................... 1075/02

(51) Int. Cl.
*H01M 16/00*   (2006.01)
(52) U.S. Cl. .......................................... 429/9; 136/252
(58) Field of Classification Search ............... 349/187; 136/252; 429/9, 12, 13, 34, 36, 38
See application file for complete search history.

(56) References Cited

U.S. PATENT DOCUMENTS 4,086,398 A   4/1978   Cartmell
5,856,211 A   1/1999   Tonazzi et al.
6,420,061 B1 * 7/2002   Fujii et al. .................... 429/26
2002/0014303 A1   2/2002   Kotani
2003/0234905 A1 * 12/2003   Gilles et al. ................ 349/187

FOREIGN PATENT DOCUMENTS

GB          2 049 214        12/1980

* cited by examiner

*Primary Examiner*—Patrick Joseph Ryan
*Assistant Examiner*—Monique Wills
(74) *Attorney, Agent, or Firm*—Sughrue Mion, PLLC

(57) ABSTRACT

The present invention concerns a multi-layered cell, particular a liquid crystal display cell (1), or an electrochemical photovoltaic cell, or a combination of a liquid crystal display cell and an electrochemical photovoltaic cell, this multi-layered cell comprising n superposed substrates (2, 4, 6, 8), n being an integer number greater than or equal to three, these substrates (2, 4, 6, 8) being joined by sealing frames (14, 16, 18) delimiting (n−1) sealed cavities (20, 22, 24) for containing an optically or electro-optically active medium, the upper surface (10) of the first substrate (2) and the lower surface (12) of the last substrate (8) forming the external faces of the cell (1), said multi-layered cell (1) being characterised in that it includes (n−1) filling holes (26, 28, 30) arranged, at least in part, on one side or other of the cell (1), said (n−1) filling holes (26, 28, 30) each communicating with a different cavity and passing through at least one cavity to reach the cavity with which they are connected, said (n−1) filling holes (26, 28, 30) being isolated from the cavity or cavities through which they pass.

14 Claims, 5 Drawing Sheets

MULTI-LAYERED CELL, PARTICULARLY A LIQUID CRYSTAL DISPLAY CELL, OR ELECTROCHEMICAL PHOTOVOLTAIC CELL

BACKGROUND OF THE INVENTION

The present invention concerns the field of multi-layered cells, i.e. cells comprising a plurality of superposed substrates joined in pairs by sealing frames delimiting as many sealed volumes for containing an optically active medium, or whose electric properties can change under the effect of an incident light.

In the simplest case, electro-optical cells such as liquid crystal cells, or electrochemical photovoltaic cells include only two substrates, namely a transparent front substrate and a back substrate that may or may not be transparent. A network of conductive elements is formed on these two substrates forming electrodes and conductive paths connecting the electrodes to connection pads. The two substrates are joined to each other by means of a sealing frame defining a sealed volume in which the active medium is trapped.

Electro-optical cells are display cells wherein the optical features of the liquid crystals trapped between the two substrates of such a cell can be modified by control voltages applied to the electrodes. Electrochemical photovoltaic cells are capable of converting visible light into electricity by exploiting the photoelectric effect, which appears in a semiconductor substrate sensitised by a dyeing agent.

In the simplest case where the cells include only two substrates and one layer of active agent trapped between the two, filling the cells does not raise any particular problems. A filling aperture is simply arranged in the sealing frames through which the active agent can penetrate the sealed volume delimited by said sealing frame. Filling is usually carried out in the following manner: after arranging the cell and the liquid crystal in a vacuum chamber, air is extracted from the cell containment volume, then the side of the cell where the filling aperture is located is plunged into a receptacle containing the active agent. The active agent penetrates the cell via capillary action, through the filling hole, helped by an increase in pressure in the chamber. When the cell has been filled, the filling aperture need only be hermetically sealed.

Another known solution consists in piercing a filling hole in one of the cell substrates. After having extracted the air, the active agent is injected through the hole into the cell and, after the cell has been filled, said hole is sealed. This second solution proves particularly advantageous insofar as it allows the cells to be filled from above, which means that one can work with sets of cells still in batches.

Whichever solution is used in order to fill the cells, it is clear that this step of manufacturing said cells does not raise any major problem, in particular because of the fact that only a single type of active agent is used. Consequently, even if the active agent, for example a liquid crystal, flows out of the filling hole and wets, particularly by capillary action, the periphery of the cell or the substrates, it is not liable to be polluted by another liquid crystal or damaging a structure of the cell that has already been deposited.

The same is not true however with cells having several levels which contain different active agents. In this case, the aforementioned problem becomes important quickly and the risk of polluting one of the active agents such as a liquid crystal by another liquid crystal is quite high.

Let us imagine the case, for example, of a liquid crystal display cell with two levels including two layers of different liquid crystals. Such a cell can be formed of an intermediate substrate that carries the electrodes on both of its faces and of two upper and lower end substrates. Each cell is thus formed by joining the upper substrate, respectively the lower substrate, to the intermediate substrate by means of a sealing frame that delimits a sealed cavity to contain the liquid crystals. These sealing frames each include a filling hole, the filling holes being preferably arranged on the same side of the cell. In order to fill the cell, two foam pads or stoppers saturated with the desired liquid crystal are then applied against the filling apertures, and then the different liquid crystals penetrate, via capillary action, their respective cavities. After removing the stoppers, the filling apertures need only be hermetically sealed.

The method described hereinbefore advantageously allows the different levels of a multi-layered cell to be simultaneously filled with liquid crystals, which can vary from one layer to the next. However, the limits of this method are quickly discovered. Indeed, in order to implement this method, it is still necessary to be able to have at least one side of the cell available, free of any connection pad insofar as these connection pads, which are used to connect the cell electrodes to an external control circuit, are usually arranged along one edge of said cell where the lower substrate projects with respect to the upper substrate. Thus, it would be difficult to access a filling hole arranged in the sealing frame at a location where the connection pads appear. The more levels a cell has, the more the number of its electrodes and thus its connection pads increases. One could thus have a situation in which the connection pads open out along every sides of a cell, such that the filling technique described hereinbefore can no longer be used.

SUMMARY OF THE INVENTION

It is an object of the present invention to overcome the aforementioned problems in addition to others, by providing a multi-layered cell such as a liquid crystal cell that is simple and thus quick and inexpensive to fill.

The present invention concerns a multi-layered cell, particularly a liquid crystal display cell, or an electrochemical photovoltaic cell, or a combination of a liquid crystal cell and an electrochemical photovoltaic cell, this multi-layered cell including n superposed substrates, n being an integer number greater than or equal to three, these substrates being joined in pairs by sealing frames delimiting (n−1) sealed cavities for containing an optically or electro-optically active medium, the upper surface of the first substrate and the lower surface of the last substrate forming the external faces of the cell, said multi-layered cell being characterised in that it includes (n−1) filling holes arranged, at least in part, on one side or another of the cell, these (n−1) filling holes each communicating with a different cavity and passing through at least one cavity to reach the cavity to which they are connected, said (n−1) filling holes being isolated from the cavity or cavities through which they pass.

As a result of these features, the present invention provides a multi-layered cell that can be filled with different liquids such as different types of liquid crystals with a limited or zero risk, of seeing these liquids mixing with each other. Moreover, filling the various layers of the cell can be carried out simultaneously, which allows the manufacturing time and number of manipulations of the cell to be reduced. Another advantage of the present invention can be seen in the fact, since the cells are no longer filled from the side of the cells but from the top, the cells can be practically finished in batches prior to being cut, which further assists in the reduction of manufacturing time and thus to the reduction in price of the cells. Finally, contact pads for connecting the electrodes of a cell to an external electric control or supply circuit can be arranged along every sides of said cell.

According to another embodiment, the present invention also concerns a multi-layered cell of the type described hereinbefore, characterised in that it includes (n−1) filling holes, at least one of these filling holes being pierced through the first or last substrate and communicating with the cavity delimited by the first, respectively the last substrate, and the opposite substrate, the remaining filling holes being arranged, at least in part, on one side or the other of the cell, these filling holes each communicating with a different cavity and passing trough at least one cavity to reach the cavity to which they are connected, said remaining filling holes being isolated from the cavity or cavities through which they pass.

According to a first variant, the filling holes are arranged inside the perimeter of the sealing frames and are surrounded by a wall also made of sealing material, which isolates them in a sealed manner from the cavities through which they pass.

According to a second variant, the filling holes are formed by microtube portions that pass through the various cavities until they open out into the cavity with which they are intended to communicate. The main advantage of this variant lies in the fact that, owing to the use of microtubes, the filling holes are automatically sealed as regards the cavities through which they pass, without it being necessary to provide any particular arrangement of the sealing frames. Moreover, the surface area occupation of the filling holes at the cell surface is reduced, such that the active surface of said cell is larger.

BRIEF DESCRIPTION OF THE DRAWING

Other features and advantages of the present invention will appear more clearly from the following detailed description of an example embodiment of a multi-layered cell according to the invention, this example being given purely by way of non-limiting illustration in conjunction with the annexed drawing in which.

DETAIL DESCRIPTION OF THE INVENTION

The present invention proceeds from the general inventive idea that consists in providing as many filling holes as there are layers of liquid active agent in the cell, each of the these filling holes communicating with a given layer to the exclusion of all the others. Since the filling holes are arranged, at least in part, on one side or the other of the cell, the latter can be filled from the top, which considerably simplifies the filling operations and practically allows the cells to be finished in batches before being separated by cutting. Moreover, since the filling holes are not arranged along one or more edges of the cell, the conductive paths that allow the electrodes of said cell to be connected to an external electric supply or control circuit, can open out on all sides of the cell.

The present invention will be described in conjunction with a multi-layered display cell of the liquid crystal type. It goes without saying, of course, that the present invention is not limited to this type of cell and that it applies in an identical manner to any type of multi-layered cell enclosing between its substrates a sensitive medium that can change physical, and particularly optical properties, via the effect of a voltage applied to the electrodes, or change electrical properties via the effect of stress or an incident light beam.

Figure 1:
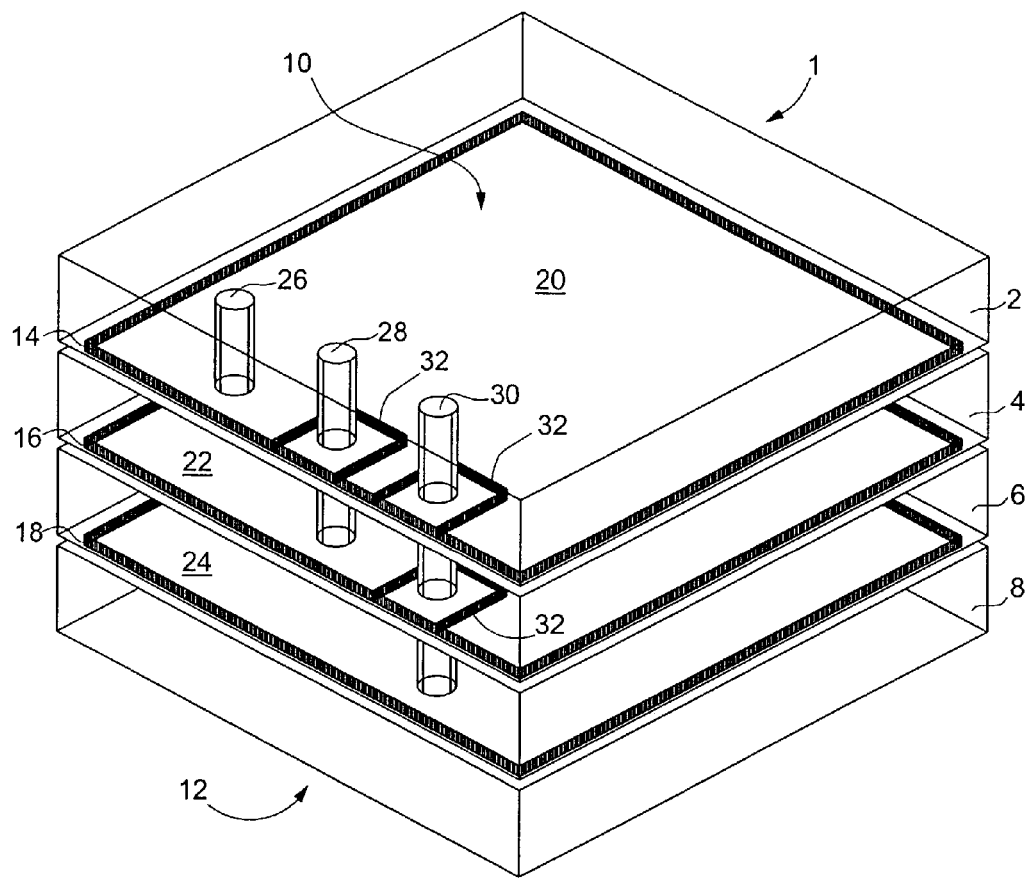
FIG. 1 is a transparent perspective view of a multi-layered liquid crystal cell comprising four superposed substrates joined in pairs by sealing frames which delimit three sealed cavities to contain liquid crystals, each of these three cavities being connected to a distinct filling hole, one of these holes opening directly into the cavity to be filled.

FIG. 1 is a transparent perspective view of a multi-layered liquid crystal display cell according to the present invention. Designated as a whole by the reference numeral 1, this display cell includes four superposed substrates 2, 4, 6 and 8, which can be made of glass or another transparent material such as plastic. It will be noted that the last substrate 8 may or may not be transparent depending upon whether display cell 1 is transmissive or reflective. The upper surface 10 of first substrate 2 and lower surface 12 of the last substrate 8 form the external faces of said cell 1.

Substrates 2 to 8 are joined in pairs by sealing frames 14, 16 and 18, which each delimit a sealed cavity, respectively 20, 22 and 24, to contain the liquid crystals. More precisely, first sealing frame 14 joins substrates 2 and 4, second sealing frame 16 joins substrates 4 and 6, and third sealing frame 18 joins substrates 6 and 8.

According to a first embodiment of the invention, display cell 1 includes three filling holes 26, 28 and 30, which each communicate with one of the three cavities 20, 22 or 24 respectively. As can be seen in FIG. 1, the three filling holes 26, 28 and 30 are arranged on the same side 10 of cell 1, the first filling hole 26 being pierced through first substrate 2 and communicating with cavity 20 delimited by first and second substrates 2 and 4 and sealing frame 14, whereas the second filling hole 28, pierced through first and second substrates 2 and 4, passes through first cavity 20 in a sealed manner and opens out into second cavity 22, and the third filling hole 30, pierced through the first, second and third substrates 2, 4 and 6, passes through first and second cavities 20 and 22 in a sealed manner and opens out into third cavity 24. Of course, according to a variant, this third filling hole could be pierced through the last substrate and open out directly into third cavity 24.

Filling holes 26, 28 and 30 are arranged inside the perimeter of sealing frames 14, 16 and 18 and are surrounded by walls 32, also made of sealing material, which isolate them in a sealed manner from the cavities through which they pass and into which the filling holes must not open out.

Figure 2:
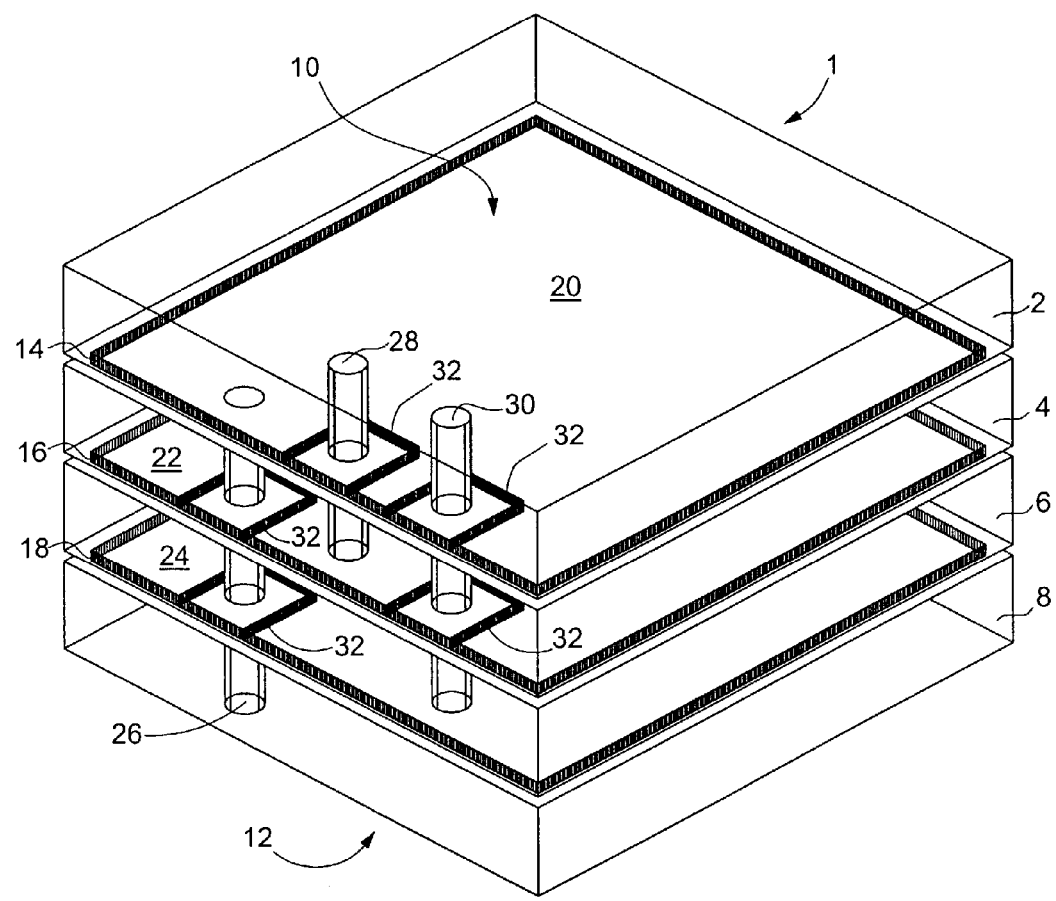
FIG. 2 is a similar view to that of FIG. 1 in which all the filling holes pass through at least one cavity before reaching the cavity to which they are connected.

According to a second embodiment of the invention shown in conjunction with FIG. 2, each of the filling holes passes through at least one cavity to reach the cavity to which it is connected. Indeed, it can be seen in FIG. 2 that filling hole 26, which is intended to communicate with cavity 20 delimited by first and second substrates 2 and 4, is arranged, not on side 10 of cell 1 as was previously the case, but on side 12 thereof, said filling hole 26 passing through third and second cavities 24 and 22 in a sealed manner and opening out into first cavity 20. The second and third filling holes 28 and 30 remain unchanged with respect to the example shown in FIG. 1. Likewise, filling holes 26, 28 and 30 are sealed as regards the cavities through which they pass but into which they must not open out, either by adding walls 32 made of sealing material as described hereinbefore, or by using microtubes adjusted to the right length.

Figure 3:
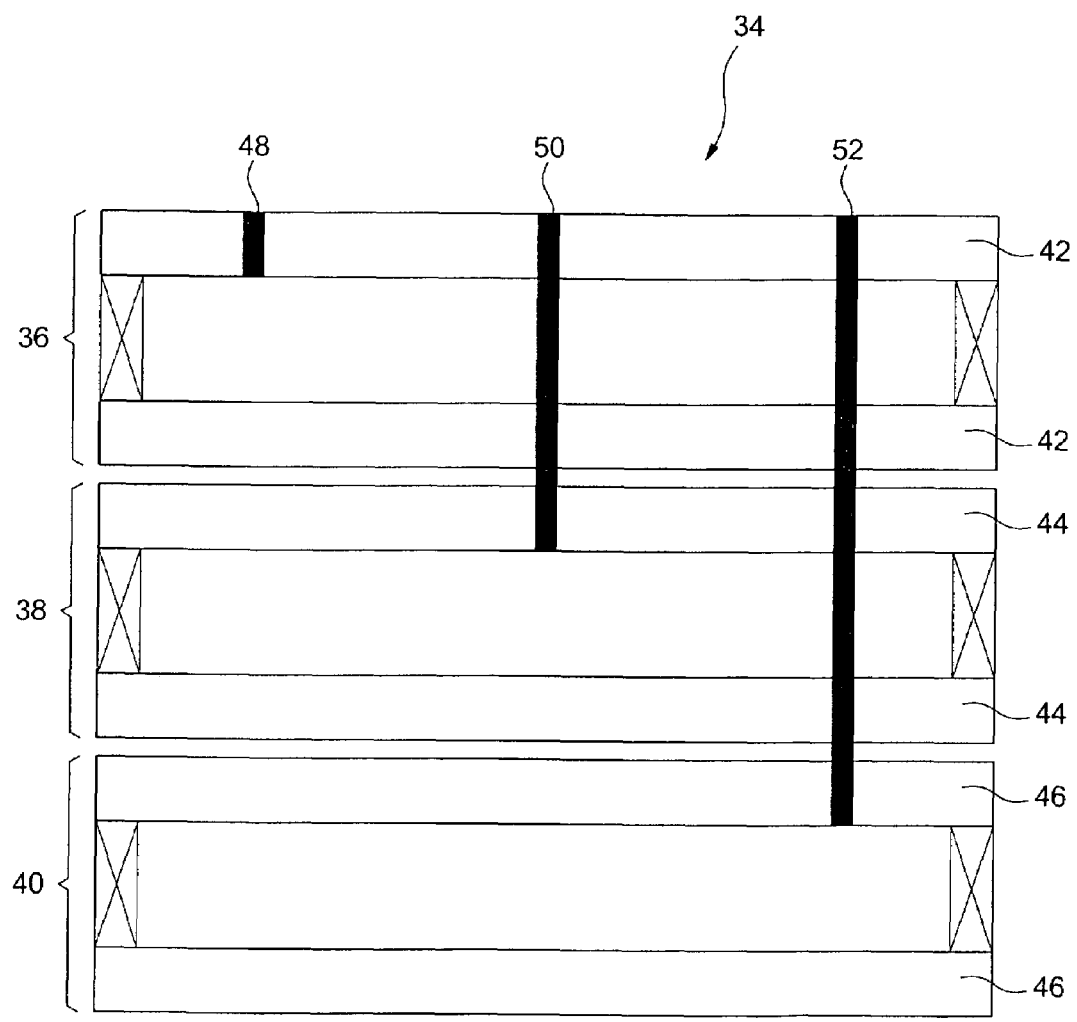
FIG. 3 is a schematic cross-section of a multi-layered cell formed of three individual cells bonded one on top of the other.

In the foregoing, a multi-layered cell was described, in which both faces of the intermediate substrates, i.e. those that do not form the external faces of the cell, are in contact with the liquid crystal. Thus, for example, substrate 4 successively delimits with substrate 2 and with substrate 6, sealed cavities 20 and 22. Of course, the present invention applies in an identical manner to the case in which the multi-layered cell is formed by a plurality of individual cells each including two substrates bonded on top of each other. Such a case is shown schematically in FIG. 3 which shows that a multi-layered cell, designated as a whole by the reference numeral 34, is formed by three individual cells 36, 38 and 40 bonded on top of each other, each cell being delimited by a pair of parallel substrates, respectively 42, 44 and 46. The space separating two successive individual cells has been shown in an exaggerated manner in order to clearly illustrate the fact that the multi-layered cell is formed of several superposed individual cells. It goes without saying, however, that the individual cells are intimately bonded on top of each other and that there is therefore no empty space between the lower substrate of a cell and the upper substrate of the next cell.

According to the invention, a first filling hole 48 is pierced in substrate 42, which forms one of the external faces of multi-layered cell 34 and opens out into the cavity formed by the first individual cell 36, a second filling hole 50 is pierced through the two substrates 42 and that of substrates 44, which is coupled to substrate 42 to open out into the cavity formed by the second individual cell 38, and a third filling hole 50 is pierced in the substrates pairs 42 and 44 and in substrate 46 coupled to substrate 44 to open out into the cavity formed by the third and last individual cell 40.

Figure 4:
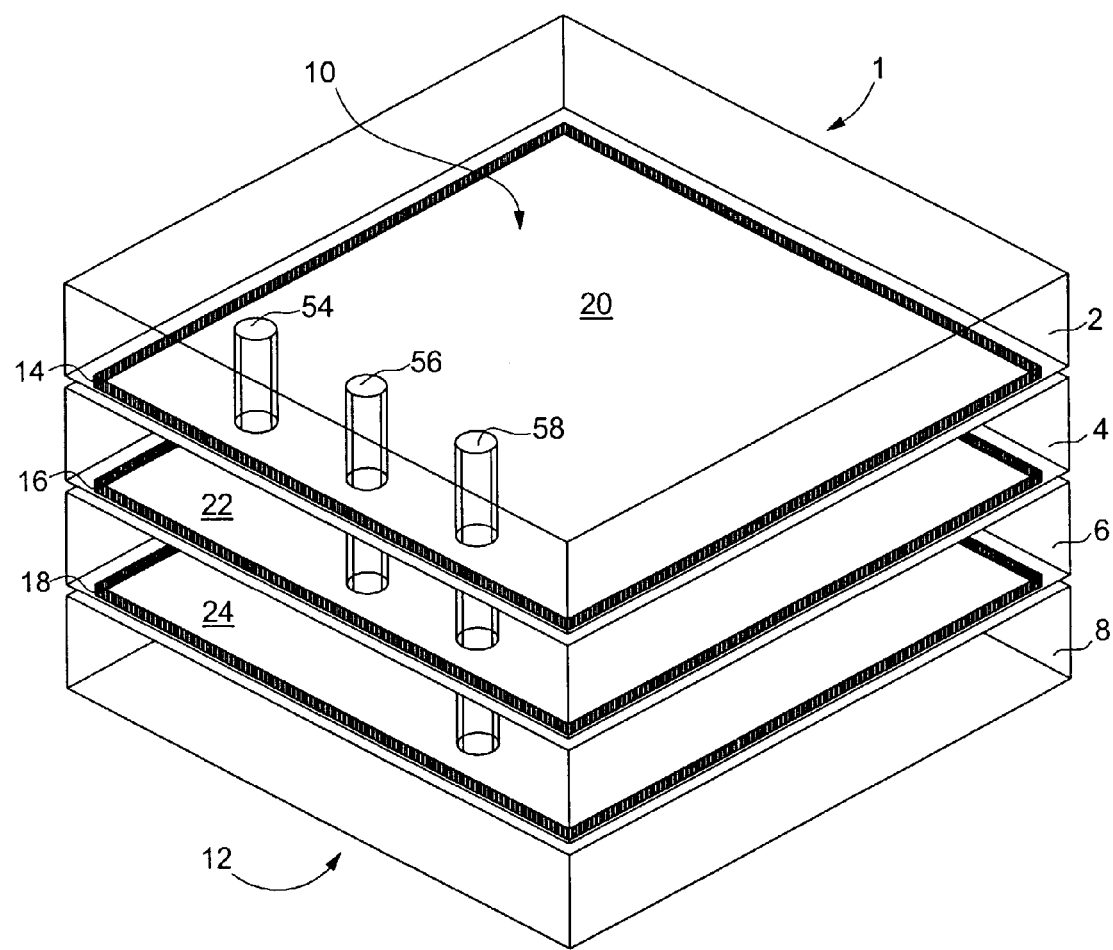
FIG. 4 is a similar view to that of FIG. 1, in which the microtube portions pass through the various cavities until they open out into the cavity with which they are intended to communicate.

According to a variant shown in FIG. 4, holes are pierced in the different substrates 2, 4 and 6, then portions of microtube, respectively 54, 56 and 58 are engaged in these holes, the lengths of said microtube portions being adjusted to enable them to pass through the various cavities 20, 22 and/or 24 until they open out into the cavity with which they are intended to communicate. The main advantage of this second embodiment lies in the fact that, since the microtube portions are sealed, the walls of sealing material, which are normally provided to isolate the filling holes from the cavities through which they pass but into which they must not open out, can be omitted. Consequently, the arrangement of the sealing frames is simplified, and especially the surface occupation of the filling holes at the surface is reduced. The active surface of the display cell will thus be larger.

Figure 5:
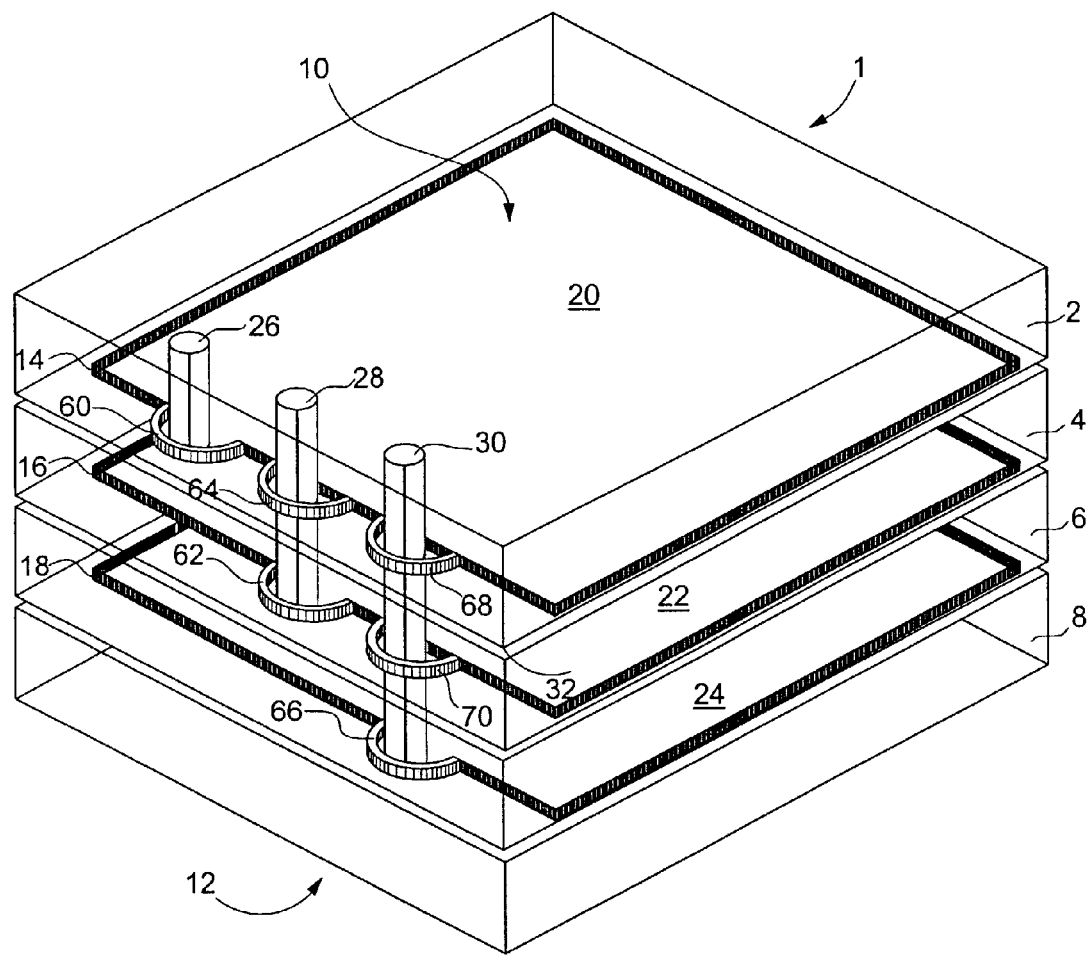
FIG. 5 is a similar view to that of FIG. 1 in which the filling holes are arranged outside the perimeter of the sealing frames.

According to another variant shown in FIG. 5, filling holes 26, 28 and 30 are provided outside the perimeter of sealing frames 14, 16 and 18. Thus, as is visible in FIG. 5, substrates 2, 4, 6 and 8 are slightly larger than the final dimensions of the desired cell. This extra space is used respectively to:

pierce the first filling hole 26 through first substrate 2, this first hole 26 communicating with cavity 20 delimited by first and second substrates 2 and 4 and sealing frame 14, said sealing frame 14 departing, locally, from its generally rectilinear shape, to form a part 60 in the shape of an arc of a circle at the place where said first hole 26 opens out, this part 60 in the shape of an arc of a circle being open into the inner volume of said cavity 20 such that the liquid crystal can enter it;

pierce the second filling hole 28 through the first and second substrates 2 and 4, this second hole 28 communicating with the cavity 22 delimited by the second and third substrates 4 and 6 and sealing frame 16, said sealing frame 16 departing, locally, from its generally rectilinear shape to form a part 62 in the shape of an arc of a circle at the place where said second hole 28 opens out, this part 62 in the shape of an arc of a circle being open into the inner volume of said cavity 22 such that the liquid crystal can enter it, this second hole 28 being able to be surrounded by a wall 64 delimiting a sealed volume at the place where it passes from the first to the second substrates 2, 4 in order to prevent the liquid crystal breaking in between said substrates 2, 4, 6 and wetting sealing frames 14 and 16;

pierce the third filling hole 30 through the first, second and third substrates 2, 4 and 6, this third hole 30 communicating with the cavity 24 delimited by the third and fourth substrates 6 and 8 and sealing frame 18, said sealing frame 18 departing, locally, from its generally rectilinear shape to form a part 66 in the shape of an arc of a circle at the place where said third hole 30 opens out, this part 66 in the shape of an arc of a circle being open into the inner volume of said cavity 24 such that the liquid crystal can enter it, this third hole 30 being able to be surrounded by walls 68 and 70 delimiting sealed volumes at the place where it passes from the first to the second substrates 2, 4 and from second to the third substrates 4, 6 in order to prevent the liquid crystal breaking in between said substrates 2, 4, 6 and wetting sealing frames 14 and 16.

Finally, after filling the cavities, the filling holes are filled with the sealing material, then the substrates can be cut to the desired dimensions.

It goes without saying that the present invention is not limited to the embodiments that have just been described, and that various modifications and simple variants can be envisaged without departing from the scope of the present invention. In particular, the present invention applies in an identical manner to a multi-layered cell comprising, for example, three superposed liquid crystal layers, and a fourth layer formed by a semiconductor material sensitised by a dyeing agent to form an electrochemical photovoltaic cell.

What is claimed is:

1. A multi-layered cell comprising n superposed substrates, n being an integer number greater than or equal to three, these substrates being joined by sealing frames delimiting sealed cavities for containing an optically or electro-optically active medium, the upper surface of the first substrate and the lower surface of the last substrate forming the external faces of the cell, wherein said multi-layered cell includes filling holes arranged, at least in part, on one side or other of the cell, said filling holes each communicating with a different cavity and passing through at least one cavity to reach the cavity with which they are connected, said filling holes being isolated from the cavity or cavities through which they pass.

2. A multi-layered cell comprising n superposed substrates, n being an integer number greater than or equal to three, these substrates being joined by sealing frames delimiting sealed cavities for containing an optically or electro-optically active medium, the upper surface of the first substrate and the lower surface of the last substrate forming the external faces of the cell, wherein said multi-layered cell includes filling holes, at least one of said filling holes being pierced through the first or last substrate and communicating with the cavity or delimited by the first, respectively the last, substrate and the opposite substrate or, the remaining filling holes being arranged, at least in part, on one side or other of the cell, said filling holes each communicating with a different cavity and passing through at least one cavity to reach the cavity with which they are connected, said remaining filling holes being isolated from the cavity or cavities through which they pass.

3. The multi-layered cell according to claim 1, wherein the filling holes are arranged inside the perimeter of the sealing frames and are surrounded by a wall that is also made of sealing material, which isolates them in a sealed manner from the cavities through which they pass.

4. The multi-layered cell according to claim 2, wherein the filling holes are arranged inside the perimeter of the sealing frames and are surrounded by a wall that is also made of sealing material, which isolates them in a sealed manner from the cavities through which they pass.

5. The multi-layered cell according to claim 1, wherein the filling holes are arranged outside the perimeter of the sealing frames.

6. The multi-layered cell according to claim 2, wherein the filling holes are arranged outside the perimeter of the sealing frames.

7. The multi-layered cell according to claim 1, wherein the filling holes are formed by portions of microtube which pass through the various cavities until they open out into the cavity with which they are intended to communicate.

8. The multi-layered cell according to claim 2, wherein the filling holes are formed by portions of microtube which pass through the various cavities until they open out into the cavity with which they are intended to communicate.

9. The multi-layered cell according to claim 1, wherein said cell is formed by at least two individual cells bonded one on top of the other.

10. The multi-layered cell according to claim 2, wherein said cell is formed by at least two individual cells bonded one on top of the other.

11. The multi-layered cell according to claim 1, wherein the optically active medium is a liquid.

12. The multi-layered cell according to claim 11, wherein the liquid comprises liquid crystals.

13. The multi-layered cell according to claim 2, wherein the optically active medium is a liquid.

14. The multi-layered cell according to claim 13, wherein the liquid comprises liquid crystals.

* * * * *